E. STENE.
MILKING DEVICE.
APPLICATION FILED NOV. 10, 1909.
955,610.
Patented Apr. 19, 1910.
2 SHEETS—SHEET 1.
Fig. 1.
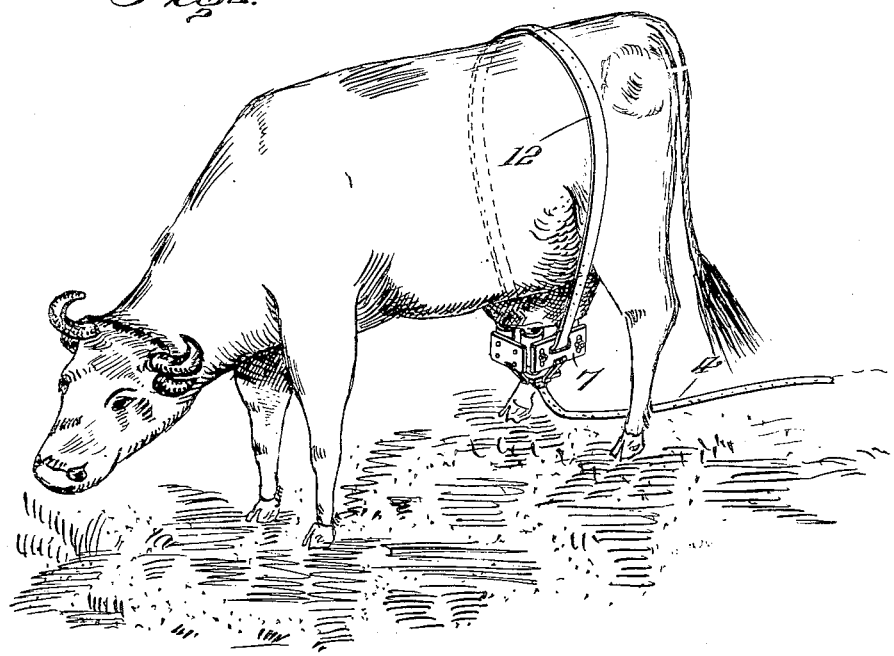
Fig. 2.
Fig. 3.
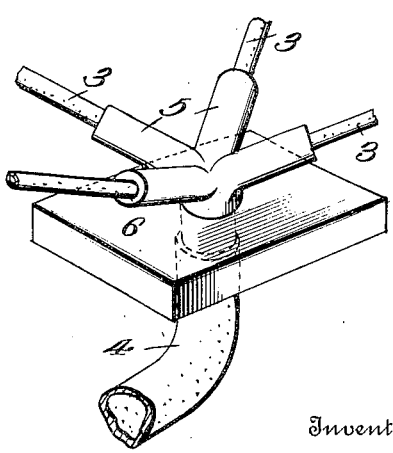
Witnesses
Inventor
E. Stene.
By
Attorneys E. STENE.
MILKING DEVICE.
APPLICATION FILED NOV. 10, 1909.
955,610.
Patented Apr. 19, 1910.
2 SHEETS—SHEET 2.
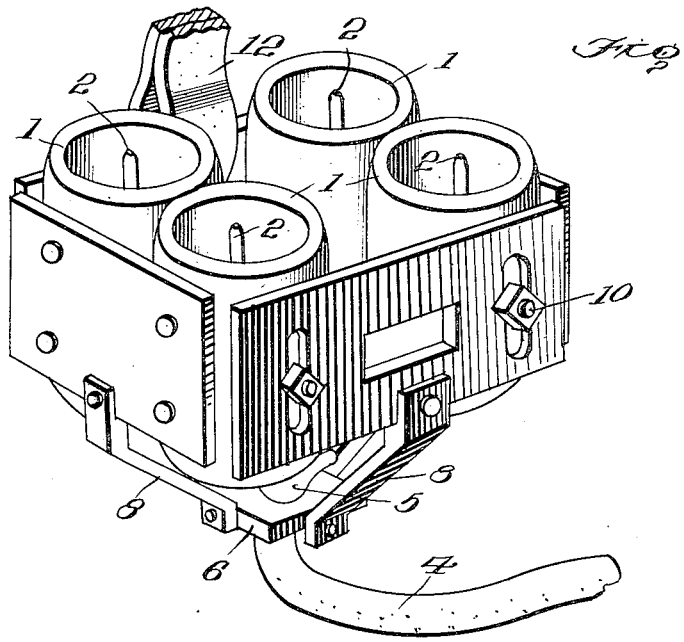
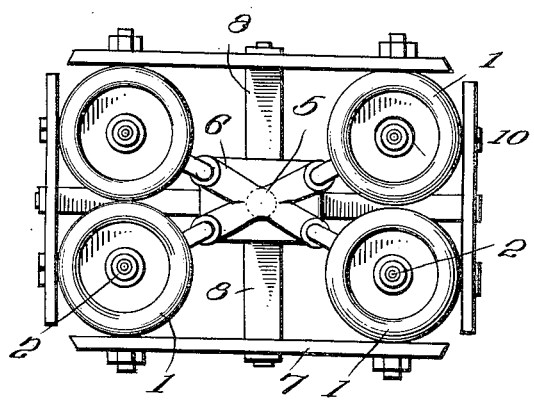
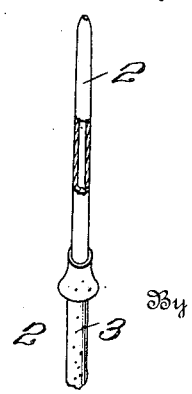
Witnesses
Inventor
E. Stene.
By
Attorneys.

UNITED STATES PATENT OFFICE.

ELLING STENE, OF EMMONS, MINNESOTA.

MILKING DEVICE.

955,610.  Specification of Letters Patent.  Patented Apr. 19, 1910.

Application filed November 10, 1909. Serial No. 527,318.

*To all whom it may concern:*

Be it known that I, ELLING STENE, citizen of the United States, residing at Emmons, in the county of Freeborn and State of Minnesota, have invented certain new and useful Improvements in Milking Devices, of which the following is a specification.

This invention has for its primary object, a simple and efficient device for use in milking cows, and the invention consists in certain constructions, arrangements and combinations of the parts that I shall hereinafter fully describe and claim.

For a full understanding of the invention, reference is to be had to the following description and accompanying drawings in which:

Figure 1 is a perspective view of a milking device constructed in accordance with my invention; Fig. 2 is a detail sectional view of the device. Fig. 3 is a perspective view of a header employed: Fig. 4 is a perspective view of the entire device, parts being broken away; Fig. 5 is a top plan view thereof; and, Fig. 6 is a detail perspective view of the tubes that are used.

Corresponding and like parts are referred to in the following description and indicated in all the views of the accompanying drawings by the same reference characters.

My invention embodies a plurality of cups that are designed to fit up over the nipples of the udder, and each of said cups contains a preferably glass tube 2 which is adapted to be inserted in the nipple so as to promote the free flow of milk. Depending from each cup and connected to the tube 2 thereof is a flexible tube 3 of rubber or the like constituting a branch of a main rubber tube 4 designed to convey the milk to the bucket or similar receptacle. The means for connecting the branch tubes with their main or common tube 4 is a four branch header 5 which is secured in a plate 6 connected to the sides of the framework 7 as by upwardly diverging bars or side bars or arms 8. The framework 7 constitutes the means for connecting the cups 1 together, and preferably each side of the framework or casing is formed with a longitudinal slot 9, a bolt or similar fastening device 10 passing through the framework or casing 7 and received in the slot so that after the casing has been strapped to the cow's body, the cups may be slipped upwardly and into the properly adjusted position. In order to suspend the device the framework or casing 7 is provided at opposite sides with slots 11 and a strap 12 is connected to the framework in said slots, the strap being designed to extend over the back of the animal.

From the foregoing description in connection with the accompanying drawings, the operation of my improved milking device will be obvious.

In the practical use of the device, after the device has been suspended from the back of the cow, the cups are adjusted so that the nipples will fit therein, and the milk will be passed from the branch tubes 3 into the main tube 4 and from thence to the milk bucket.

Having thus described the invention, what is claimed as new is:

1. A device of the character described, embodying a casing, cups mounted within said casing and having a vertically adjustable connection therewith, tubes contained within the respective cups, and discharge tubes depending from said cups and connected to the first named tubes.

2. A device of the character described, comprising a casing, cups mounted within said casing, discharge tubes leading from said cups, a plate suspended from said casing, a header mounted in said plate and having branch arms connected to the discharge tubes, and a main tube connected to said header.

3. A device of the character described, comprising a casing formed at its opposite sides with slots, a suspension strap adapted to be connected to said casing in said slots, cups mounted within said casing, tubes within the cups, discharge tubes depending from said cups and connected to the first named tubes, and a main tube to which all of said discharge tubes are connected as and for the purpose set forth.

In testimony whereof I affix my signature in presence of two witnesses.

ELLING STENE. [L. S.]

Witnesses:
 NELLIE STENE,
 PETER M. SHELLWICK.